(12) United States Patent
Dietrich et al.

(10) Patent No.: US 11,373,128 B1
(45) Date of Patent: Jun. 28, 2022

(54) APPARATUSES AND METHODS FOR COMPLAINT PRIORITIZATION

(71) Applicant: Wells Fargo Bank, N.A., San Francisco, CA (US)

(72) Inventors: David Dietrich, Charlotte, NC (US); Jennifer Aydelott, Irving, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 213 days.

(21) Appl. No.: 16/441,882

(22) Filed: Jun. 14, 2019

(51) Int. Cl.
*G06Q 10/06* (2012.01)
*G06F 16/2457* (2019.01)
*G06F 16/28* (2019.01)

(52) U.S. Cl.
CPC ... *G06Q 10/0635* (2013.01); *G06F 16/24578* (2019.01); *G06F 16/285* (2019.01)

(58) Field of Classification Search
CPC combination set(s) only.
See application file for complete search history.

(56) References Cited

U.S. PATENT DOCUMENTS

| | | | |
|---|---|---|---|
| 8,161,060 B2 | 4/2012 | Frayman et al. | |
| 8,996,397 B2 | 3/2015 | Grace et al. | |
| 2011/0106578 A1* | 5/2011 | Cerminaro | G06Q 10/0635 705/7.28 |
| 2012/0259673 A1 | 10/2012 | Melquist et al. | |
| 2013/0204650 A1* | 8/2013 | Sabharwal | G06Q 30/016 705/7.13 |
| 2014/0129536 A1* | 5/2014 | Anand | G06N 7/005 707/706 |
| 2014/0214886 A1 | 7/2014 | Annapragada et al. | |
| 2015/0186813 A1* | 7/2015 | Rosenoer | G06Q 10/0635 705/7.28 |
| 2016/0180264 A1 | 6/2016 | Beck et al. | |
| 2018/0189691 A1 | 7/2018 | Oehrle et al. | |
| 2019/0379678 A1* | 12/2019 | McLean | H04L 63/1425 |
| 2020/0302364 A1* | 9/2020 | Singh | G06Q 10/06316 |

\* cited by examiner

*Primary Examiner* — Arif Ullah
(74) *Attorney, Agent, or Firm* — Womble Bond Dickinson (US) LLP

(57) ABSTRACT

A method, apparatus, and computer program product for complaint risk identification and prioritization are provided. An example method includes receiving, by a computing device, one or more internal complaints each associated with an internal user and one or more external complaints each associated with an external user. An internal user has access to one or more internal applications of the computing device while an external user lacks access to said internal applications. The method further includes determining, via risk evaluation circuitry, one or more risk indicia for each internal complaint and each external complaint. The method includes generating, via integration circuitry, a compiled complaint dataset of the one or more internal complaints and the one or more external complaints. The method may subsequently include ranking, by risk prioritization circuitry, the compiled complaint dataset based upon the risk indicia for each internal complaint and each external complaint.

22 Claims, 6 Drawing Sheets

APPARATUSES AND METHODS FOR COMPLAINT PRIORITIZATION

TECHNOLOGICAL FIELD

Example embodiments of the present invention relate generally to complaint management and, more particularly, to complaint risk identification and prioritization.

BACKGROUND

Entities, organizations, businesses, etc. may receive complaints related to personnel errors, regulatory compliance, and the like in the normal course of business. In some instances, these complaints may be submitted by employees or other internal parties, and, in other instances, these complaints may be submitted by customers, agencies, or other external third parties. Complaints, internal or external, may include an associated severity, relative risk, and the like.

BRIEF SUMMARY

An increasing public concern regarding transparent and ethical business practices has resulted in increased employee/consumer interaction often through public evaluations, submitted complaints, and the like. Similarly, governmental entities and other regulatory agencies have echoed these concerns by monitoring business practices to ensure compliance with applicable regulations, guidelines, etc. Traditional methods for monitoring complaints, however, fail to adapt emerging computing resources to efficiently compile and addresses complaints not only from internal users (e.g., employees) but also from external users (e.g., customers, regulatory agencies, etc.). Due to these inefficiencies, complaints with similar or related risks may be delayed, overlooked, and/or directed to improper parties (e.g., the same complaint handled by multiple responses). Furthermore, these conventional methods and systems fail to anticipate and protect internal users (e.g., employees) from potential retaliation from their complaints.

To solve these issues and others, example implementations of embodiments of the present invention may utilize a risk prioritization server to provide improved risk identification, complaint management, and prioritization. Embodiments of the present disclosure provide improved risk identification and prioritization by receiving one or more internal and external complaints and identifying risk indicia (e.g., response timing requirements, regulatory identifiers, retaliation attributes, geographic indicators, and the like). These internal and external complaints are subsequently compiled and ranked based upon the identified risk indicia in order to properly prioritize the compiled complaints for efficient administration of the same. In doing so, such example implementations confront and solve at least three technical challenges: (1) they reliably identify risk indicia associated with complaints, (2) they efficiently compile and rank internal and external complaints based upon identified risk, and (3) they anticipate and protect internal users from potential retaliation.

Systems, apparatuses, methods, and computer program products are disclosed herein for providing complaint risk identification and prioritization. In one embodiment, with reference to the claimed method, a method for complaint risk identification and prioritization is provided. The method may include receiving, by a computing device, one or more internal complaints, and each internal complaint may be associated with an internal user. The method may include, determining, via risk evaluation circuitry, one or more risk indicia for each internal complaint. The method may further include receiving, by the computing device, one or more external complaints, and each external complaint may be associated with an external user. The method may include determining, via the risk evaluation circuitry, one or more risk indicia for each external complaint. The method may also include generating, via integration circuitry, a compiled complaint dataset of the one or more internal complaints and the one or more external complaints. The method may further include ranking, by risk prioritization circuitry, the compiled complaint dataset based upon the risk indicia.

In some embodiments, the internal user may include a user having access to one or more internal applications of the computing device. Conversely, an external user may include a user lacking access to internal applications of the computing device.

In some cases, generating the compiled complaint dataset may further include grouping internal complaints and external complaints having one or more common risk indicia.

In some embodiments, the one or more risk indicia further include response timing requirements and compiling the internal complaints and the external complaints further includes grouping the complaints based upon the response timing requirements. In such an embodiment, ranking the compiled complaint dataset may further include first ranking grouped internal and external complaints having the response timing requirements.

In other embodiments, the risk indicia may further include a regulatory identifier and compiling the internal complaints and the external complaints may further include grouping the complaints based upon the regulatory identifier. In such an embodiment, ranking the compiled complaint dataset may further include first ranking grouped internal and external complaints having the regulatory identifier.

In some still further embodiments, the risk indicia may include a retaliation attribute and compiling the internal complaints and the external complaints may include grouping the complaints based upon the retaliation attribute. In such an embodiment, ranking the compiled complaint dataset may further include first ranking grouped internal and external complaints having the retaliation attribute.

In some embodiments, the risk indicia may further include one or more of a geographic indicator, industry indicator, issue indicator, personnel indicator, or the like such that the internal complaints and the external complaints may be grouped based upon one or more of these indicators.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
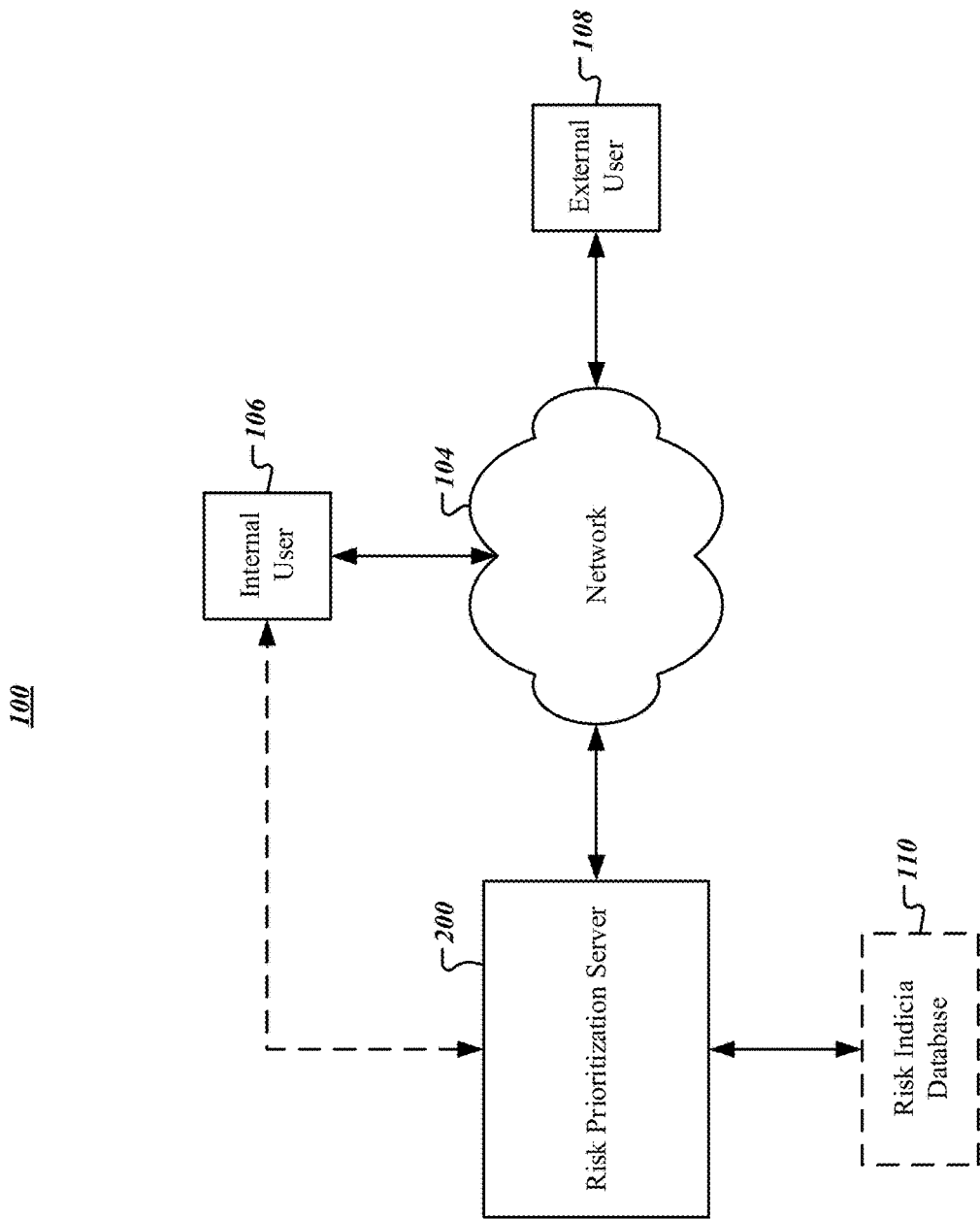
FIG. 1 illustrates a system diagram including devices that may be involved in some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a risk prioritization server as an example "apparatus." However, elements of the apparatus described herein may be equally applicable to the claimed method and computer program product. Thus, use of any such terms should not be taken to limit the spirit and scope of embodiments of the present invention.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "user device," "mobile device," "electronic device" and the like refer to computer hardware that is configured (either physically or by the execution of software) to access one or more services made available by a risk prioritization server (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), and the like. In some embodiments, a user device may include a "smart device" that is equipped with chip of other electronic device that is configured to communicate with the external device via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the risk prioritization server 200 or other computing device via a network.

As used herein, the term "internal user" refers to any user having access to one or more internal applications hosted by the risk prioritization server 200. As such, the internal user may be communicably coupled with the risk prioritization server 200 directly or via a network (e.g., a network connection only accessible to internal users). For example, an internal user may include employees or business units of a financial institution, corporation, or other entity that may have access to one or more internal applications of the risk prioritization server 200 (e.g., a server of the financial instruction, corporation, or entity). While described herein as an internal user, the present disclosure contemplates that the internal user may refer to any user device, as defined above, operated by an internal user to transmit and receive data from the risk prioritization server 200.

As used herein, the term "external user" refers to any user to which access to one or more internal applications hosted by the risk prioritization server 200 is precluded. As such, the external user may be communicably coupled with the risk prioritization server 200 via a network as opposed to direct communication. For example, an external user may include customers of a financial institution, corporation, or other entity and/or regulatory agencies monitoring or investigating the financial institution, corporation, or other entity. While described herein as an external user, the present disclosure contemplates that the external user may refer to any user device, as defined above, operated by an external user to transmit and receive data from the risk prioritization server 200.

As used herein, the term "risk indicia database" refers to a data structure or repository for storing risk indicia, risk thresholds, and the like. Similarly, the "risk indicia" of the risk indicia database may refer to potential risk indicia types, categories, requirements, etc. of the internal and external complaints (e.g., a response timing requirement, a regulatory identifier, a retaliation attribute, a geographic indicator, industry indicator, issue indicator, personnel indicator, or the like). The risk indicia database may be accessible by one or more software applications of the risk prioritization server 200.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., a risk prioritization server 200) communicably connected via a network 104 to an internal user 106 (e.g., user device associated with an internal user) and an external user 108 (e.g., user device associated with an external user). The example system 100 may also include a risk indicia database 110 that may be hosted by the risk prioritization server 200 or otherwise hosted by devices in communication with the risk prioritization server 200.

The risk prioritization server 200 may include circuitry, networked processors, or the like configured to perform some or all of the apparatus-based (e.g., risk prioritization server-based) processes described herein, and may be any suitable network server and/or other type of processing device. In this regard, risk prioritization server 200 may be embodied by any of a variety of devices. For example, the risk prioritization server 200 may be configured to receive/transmit data (e.g., risk indicia data) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs, but will nevertheless include at least the components illustrated in FIG. 2 and described in connection therewith. In some embodiments, the risk prioritization server 200 may be located remotely from the internal user 106, the external user 108, and/or risk indicia database 110, although in other embodiments, the risk prioritization server 200 may comprise the internal user 106 (e.g., a user device associated with the internal user 106) and/or the risk indicia database 110. The risk prioritization server 200 may, in some embodiments, comprise several servers or computing devices performing interconnected and/or distributed functions. Despite the many arrangements contemplated herein, the risk prioritization server 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

As noted above, the internal user 106 may refer to a user device of the internal user 106 and may be a cellular telephone (e.g., a smartphone and/or other type of mobile telephone), laptop, tablet, electronic reader, e-book device, media device, wearable, smart glasses, smartwatch, or any combination of the above. Although a single user device of the internal user 106 is illustrated, the example system 100 may include any number of user devices associated with any number of respective internal users.

As noted above, the external user 108 may refer to a user device of the external user 108 and may be a cellular telephone (e.g., a smartphone and/or other type of mobile telephone), laptop, tablet, electronic reader, e-book device, media device, wearable, smart glasses, smartwatch, or any combination of the above. Although a single user device of the external user 108 is illustrated, the example system 100 may include any number of user devices associated with any number of respective external users.

The risk indicia database 110 may be stored by any suitable storage device configured to store some or all of the information described herein (e.g., memory 204 of the risk prioritization server 200 or a separate memory system separate from the risk prioritization server 200, such as one or more database systems, backend data servers, network databases, cloud storage devices, or the like provided by an external device (e.g., online application, external user 108, or $3^{rd}$ party provider) or the internal user 106). The risk indicia database 110 may comprise data received from the risk prioritization server 200 (e.g., via a memory 204 and/or processor(s) 202) or the internal user 106, and the corresponding storage device may thus store this data.

Figure 2:
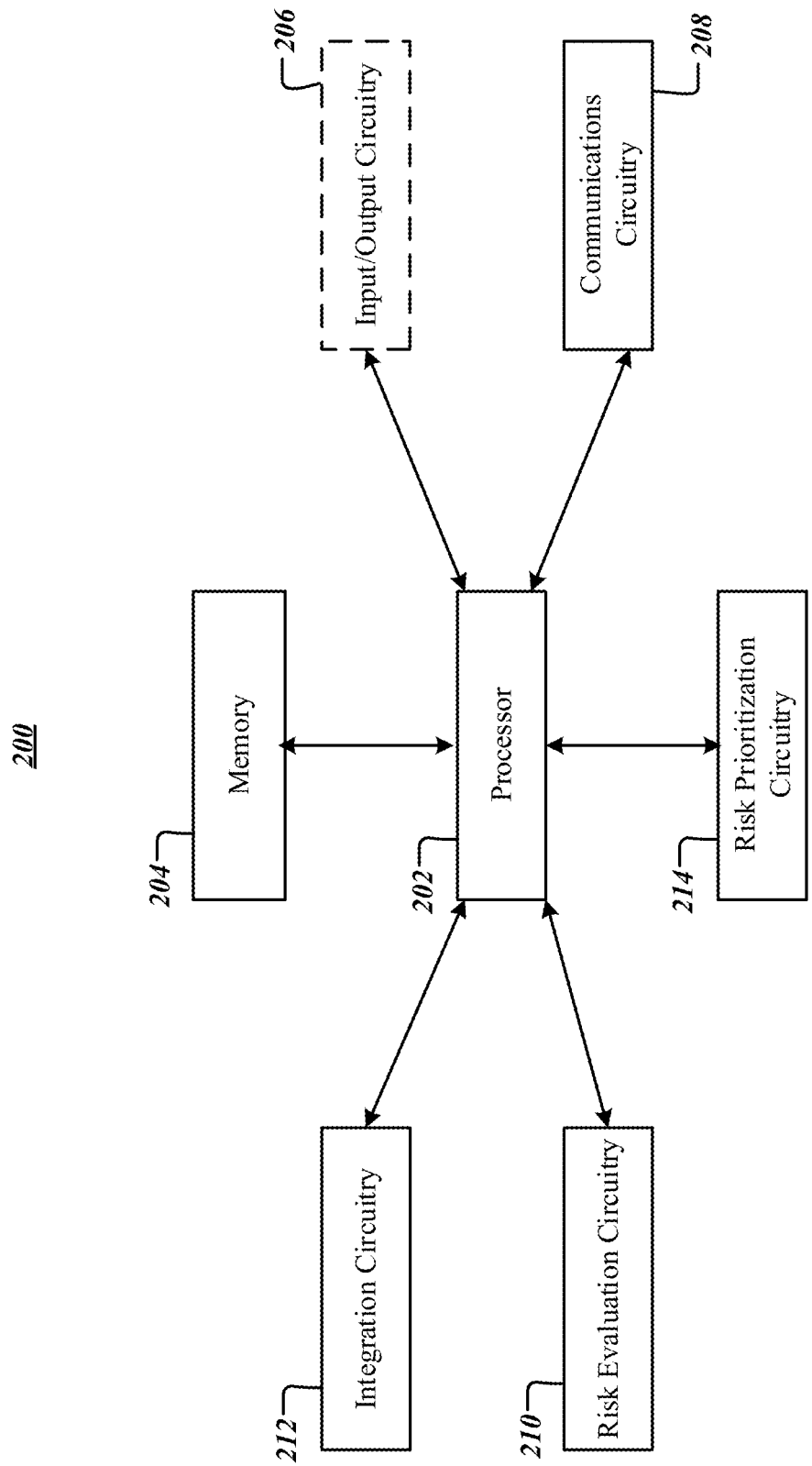
FIG. 2 illustrates a schematic block diagram of example circuitry that may perform various operations, in accordance with some example embodiments described herein.

As illustrated in FIG. 2, the risk prioritization server 200 may include a processor 202, a memory 204, input/output circuitry 206, and communications circuitry 208. Moreover, the risk prioritization server 200 may include risk evaluation circuitry 210, integration circuitry 212, and risk prioritization circuitry 214. The risk prioritization server 200 may be configured to execute the operations described below in connection with FIGS. 3-5. Although components 202-214 are described in some cases using functional language, it should be understood that the particular implementations necessarily include the use of particular hardware. It should also be understood that certain of these components 202-214 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the risk prioritization server 200 may be housed within one or more of the internal user 106 (e.g., user device of the internal user) and/or the external user 108 (e.g., user device of the external user). It will be understood in this regard that some of the components described in connection with the risk prioritization server 200 may be housed within one of these devices, while other components are housed within another of these devices, or by yet another device not expressly illustrated in FIG. 1. In some embodiments, the risk prioritization server 200 may operate as a central repository that is accessible by various user devices (e.g., computing systems associated with customers, employees, regulatory agencies, etc.).

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the risk prioritization server 200 may provide or supplement the functionality of particular circuitry.

In some embodiments, the processor 202 (and/or coprocessor or any other processing circuitry assisting or otherwise associated with the processor) may be in communication with the memory 204 via a bus for passing information among components of the risk prioritization server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the risk prioritization server 200 to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the risk maintenance server, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The risk prioritization server 200 further includes input/output circuitry 206 that may, in turn, be in communication with processor 202 to provide output to a user and to receive input from a user, user device, or another source (e.g., so as receive and/or transmit risk indicia data). In this regard, the input/output circuitry 206 may comprise a display that may be manipulated by a mobile application. In some embodiments, the input/output circuitry 206 may also include additional functionality keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the risk prioritization server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the risk prioritization server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The risk evaluation circuitry 210 includes hardware components designed to identify one or more risk indicia of an internal complaint and/or an external complaint. The risk evaluation circuitry 212 may utilize processing circuitry, such as the processor 202, to perform its corresponding operations, and may utilize memory 204 to store collected information. By way of example, in some instances, an internal complaint may include one or more risk indicia such as referring to an urgent response deadline, required regulatory agency response, a high interest geographic area/business unit, or the like. The risk evaluation circuitry 210 may analyze the example internal complaint in order to identify these one or more risk indicia and may utilize natural language processing (NLP) and/or other analysis techniques in order to identify these risk indicia.

The integration circuitry 212 includes hardware components designed to compile internal complaints (and associated risk indicia) and external complaints (and associated risk indicia) to form a compiled complaint dataset. The integration circuitry 212 may, in some embodiments, be configured to group the internal complaints and the external complaints based upon common risk indicia. The integration circuitry 212 may utilize processing circuitry, such as the processor 202, to perform its corresponding operations, and may utilize memory 204 to store collected information.

The risk prioritization circuitry 214 includes hardware components designed to rank the compiled complaint dataset based upon the risk indicia. The risk prioritization circuitry 214 may, in some embodiments, first rank grouped complaints having elevated risk (e.g., response timing requirements, regulatory identifiers, and/or retaliation attributes) and may further rank group complaints based upon one or more weighted criteria. The risk prioritization circuitry 214 may utilize processing circuitry, such as the processor 202, to perform its corresponding operations, and may utilize memory 204 to store collected information.

It should also be appreciated that, in some embodiments, the risk evaluation circuitry 210, integration circuitry 212, or risk prioritization circuitry 214, may include a separate processor, specially configured field programmable gate array (FPGA), or application specific interface circuit (ASIC) to perform its corresponding functions.

In addition, computer program instructions and/or other type of code may be loaded onto a computer, processor or other programmable risk maintenance server's circuitry to produce a machine, such that the computer, processor other programmable circuitry that execute the code on the machine create the means for implementing the various functions, including those described in connection with the components of risk prioritization server 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Complaint Prioritization

Figure 3:
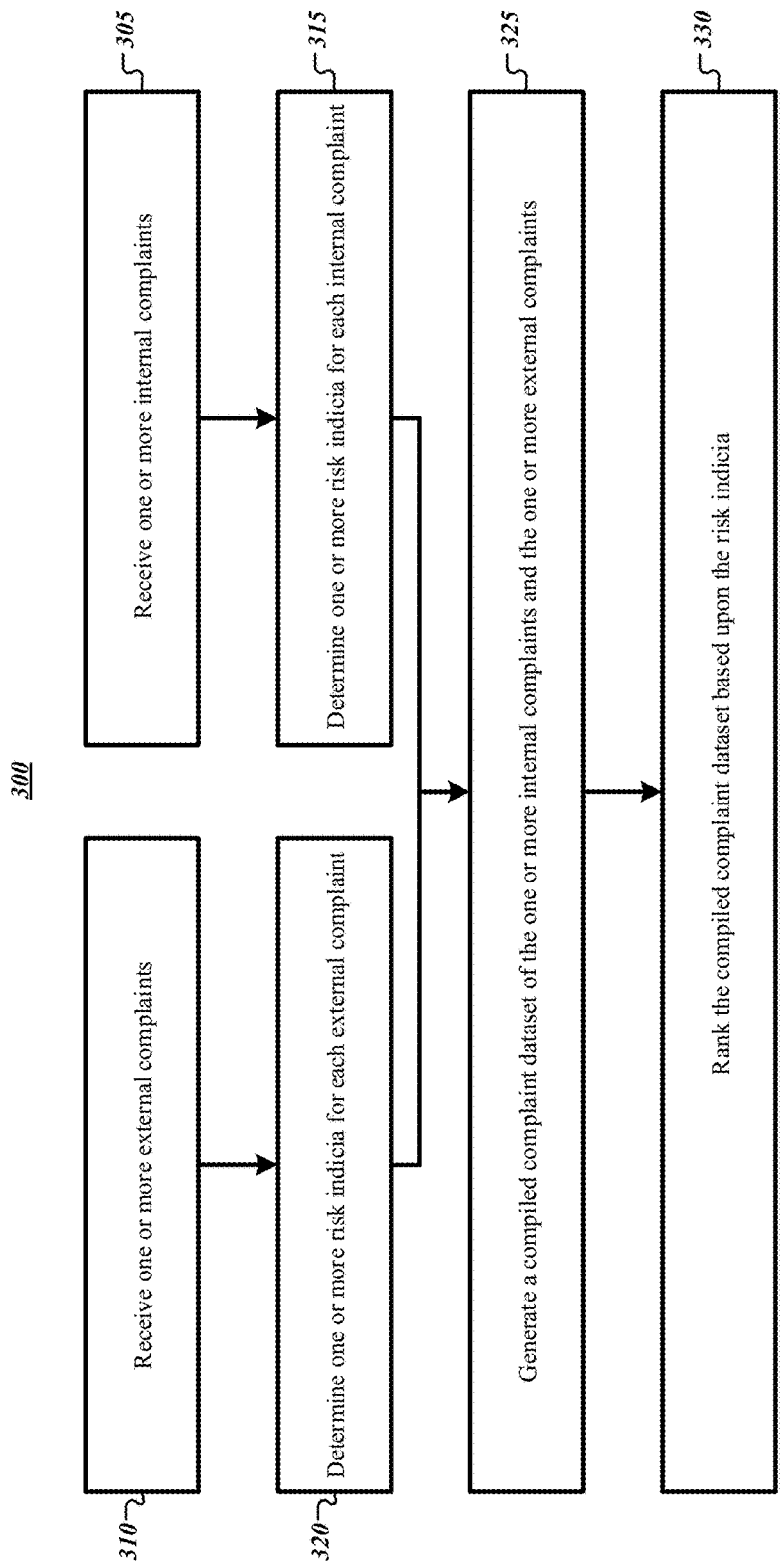
FIG. 3 illustrates an example flowchart for complaint risk identification and prioritization, in accordance with some example embodiments described herein.

FIG. 3 illustrates a flowchart containing a series of operations for complaint risk identification and prioritization. The operations illustrated in FIG. 3 may, for example, be performed by, with the assistance of, and/or under the control of an apparatus (e.g., risk prioritization server 200), as described above. In this regard, performance of the operations may invoke one or more of processor 202, memory 204, input/output circuitry 206, communications circuitry 208, integration circuitry 212, risk evaluation circuitry 210, and/or risk prioritization circuitry 214.

As shown in operation 305, the apparatus (e.g., risk prioritization server 200) includes means, such as input/output circuitry 206, communications circuitry 208, or the like, for receiving one or more internal complaints. As described above, each internal complaint may be associated with an internal user 106 that has access to one or more internal applications of the risk prioritization server 200 (e.g., or an entity associated with the risk prioritization server 200). By way of example, an internal user 106 may include employees or business units of a financial institution such that an internal complaint corresponds to a complaint submitted by the employees or business units. As described hereafter with reference to FIG. 6, in some embodiments, the internal user may input information related to the complaint such as the internal user's name, date of complaint, date of incident, location of incident, applicable industry, name of agent (e.g. or other allegedly offending party), etc. As would be evident to one of ordinary skill in the art in light of the present disclosure, the internal complaint received by the apparatus 200 may include any information based upon the intended application or necessary to comply with applicable complaint requirements.

In some instances, a form with prompts, menus, inputs, or the like may be configured to receive information related to the internal complaint from the internal user 106. Said differently, the internal user 106 may designate information (e.g., via inputs into the appropriate fields) related to risk indicia described hereafter. In other instances, the internal complaints received by the apparatus 200 may not include designated fields, prompts, menus, or the like configured to receive information. By way of example, the apparatus 200 may receive an internal complaint sent via email or other unorganized text input. As such, the apparatus, via the risk evaluation circuitry 210 or the like, may analyze the unorganized text input and identify one or more risk indicia as described hereafter at operation 315.

As shown in operation 310, the apparatus (e.g., risk prioritization server 200) includes means, such as input/output circuitry 206, communications circuitry 208, or the like, for receiving one or more external complaints. Similar to operation 305, each external complaint may be associated with an external user 108 to which access to one or more internal applications of the risk prioritization server 200 (e.g., or an entity associated with the risk prioritization server 200) is precluded. By way of example, an external user 108 may include a customer of a financial institution or regulatory agencies monitoring the financial institution such that an external complaint corresponds to a complaint submitted by the customers or regulatory agency. As described hereafter with reference to FIG. 6, in some embodiments, the external user may input information related to the complaint such as the external user's name, date of complaint, date of incident, location of incident, applicable industry, name of agent (e.g. or other allegedly offending party), etc. As would be evident to one of ordinary skill in the art in light of the present disclosure, the external complaint received by the apparatus 200 may include any information based upon the intended application or necessary to comply with applicable complaint requirements.

In some instances, a form with prompts, menus, inputs, or the like may be configured to receive information related to the internal complaint from the internal user 106. Said differently, the external user 108 may designate information (e.g., via inputs into the appropriate fields) related to risk indicia described hereafter. In other instances, the external complaints received by the apparatus 200 may not include designated fields, prompts, menus, or the like configured to receive information. By way of example, the apparatus 200 may receive an external complaint from a regulatory agency that is sent via email, mail, secure data site, or other unorganized text input. As such, the apparatus, via the risk evaluation circuitry 210 or the like, may analyze the unorganized text input and identify one or more risk indicia as described hereafter at operation 320.

Figure 6:
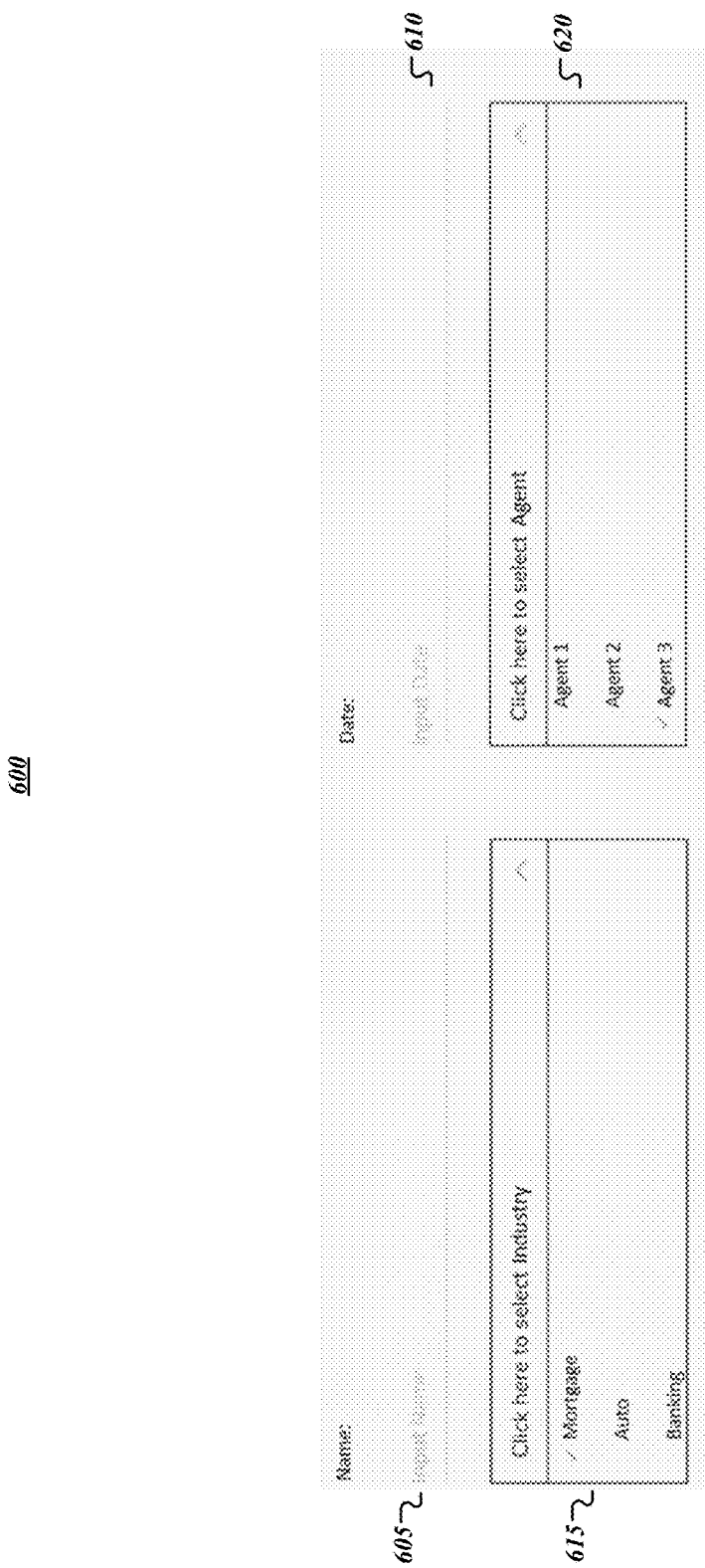
FIG. 6 illustrates an example interface for receiving complaints, in accordance with some example embodiments, described herein.

Thereafter, as shown in operations 315 and 320, the apparatus (e.g., risk prioritization server 200) includes means, such as risk evaluation circuitry 210 or the like, for determining one or more risk indicia for each internal complaint and external complaint, respectively. As described above, in some instances the internal and external complaints received at operations 305, 310 may include information designated by the respective internal or external user as relevant to a particular type of information. For example, the complaint may include menus or other limited option selections (e.g., as shown in FIG. 6) such that the internal user or external user's selection of an option facilitates determination of the one or more risk indicia for the internal or external complaint. By way of a more particular example, an internal or external user may be prompted to select the industry or business unit to which the complaint pertains such that the risk prioritization server 200, via the risk evaluation circuitry 210, may determine this risk indicia in response to the user's selection (e.g., without further analysis). In other instances, the internal or external complaint may include free text entry (e.g., what was the date of the incident?) for internal or external user input. In this way, the risk prioritization server 200, via the risk evaluation circuitry 214, may initially identify the relevant risk indicia type (e.g., the incident date) but may further analyze the free text entry to properly determine the risk indicia.

In some embodiments, however, the internal complaints and external complaints received by the risk prioritization server 200 may fail to include any limitation on the particular type of information contained within the complaint. By way of example, the internal and/or external complaints may include free text entry without menus, prompts, or the like (e.g., what is your complaint?) such that the risk evaluation circuitry 210 may require further analysis of the free text entry in order to determine the one or more risk indicia. In particular, the risk evaluation circuitry 210 may employ natural language processing (NLP) in order to analyze the free text entry of the internal and/or external complaints to identify risk indicia. While described herein with reference to NLP, the present disclosure contemplates that any method or technique for extracting or interpreting data from natural language inputs (e.g., grammar induction, tagging, parsing, machine translation, optical character recognition, topic segmentation, word sense disambiguation, or the like) may be used by the risk evaluation circuitry 210.

As described above, risk indicia may refer to potential risk indicia types, categories, requirements, etc. of the internal and external complaints (e.g., a response timing requirement, a regulatory identifier, a retaliation attribute, a geographic indicator, industry indicator, issue indicator, personnel indicator, or the like). As would be evident to one of ordinary skill in the art in light of the present disclosure, risk indicia may refer to any information contained within the internal or external complaints indicative of some associated risk. As described hereafter, various example embodiments are described for risk indicia in the context of a financial institution. The technical solutions and features described herein, however, may be equally applicable to any business, corporation, entity, or the like. Furthermore, the present disclosure contemplates that each internal complaint and external complaint may include numerous risk indicia of varying types such that the compilation of complaints based upon said indicia may consider the determined risk indicia alone or in any combination.

In some embodiments, the one or more risk indicia for each internal complaint and each external complaint determined at operations 315, 310 may include one or more geographic indicators. By way of example, an internal or external complaint may include information relating to the geographic location of the associated internal user or external user. As noted above, this information may be selected from a list of menu options (e.g., select your location from the list below), presented in response to a geographic prompt (e.g., where are you located?), and/or determined from analysis of a free text input. In other embodiments, the geographic indicator may include information relating to the geographic location of an alleged incident, business location, personnel location, or the like and may be explicitly provided by an internal or external user or may be received by the risk prioritization server 200 with the internal or external complaint. Said differently, the transmission of the internal complaint and/or external complaint (e.g., over network 104 or via direct communication from the internal user 106) may include geolocation data, GPS coordinates, etc. indicative of the location of the internal user, external user, location of alleged incident (i.e., in an instance in which the user is located at the site of the incident), and/or the like.

In some embodiments, the one or more risk indicia for each internal complaint and each external complaint determined at operations 315, 310 may include one or more industry indicators. By way of example, an internal or external complaint may include information relating to the industry associated with the internal user, external user, and/or complaint. As noted above, this information may be selected from a list of menu options, presented in response to an industry prompt, and/or determined from analysis of a free text input. In some further embodiments, such as in the instance of an external complaint, the industry indicator may be determined by the nature of the associated external user. For example, an external complaint from the consumer financial protection bureau (CFPB) may be indicative that the industry associated with the external complaint is consumer finance. In some embodiments, the industry indicators for an internal complaint may similarly be explicitly provided by the employment of the internal user. Said differently, the transmission of the internal complaint may include details regarding the job title, employment location, etc. indicative of the industry of the internal user. For example, an internal complaint from a user employed in a mortgage related position at a financial institution may include industry indicators of the mortgage industry.

In some embodiments, the one or more risk indicia for each internal complaint and each external complaint determined at operations 315, 320 may include one or more issue indicators or personnel indicators. By way of example, an internal or external complaint may include information relating to the issue of the complaint and/or personnel associated with the complaint. As noted above, this information may be selected from a list of menu options, presented in response to an issue/personnel prompt, and/or determined from analysis of a free text input. In these instances, the issue or personnel identifier may be explicitly provided by the internal or external complaint (e.g., a named party or named issue). In other instances, the risk evaluation circuitry 210 may determine the issue and/or personnel based upon other information within the associated complaint (e.g., internal or external). For example, an external complaint may not explicitly reference personnel associated with the alleged complaint. The external complaint, however, may include information related to the time of the alleged incident and/or the business or industry of the incident such that the risk evaluation circuitry 210 may determine personnel in this industry working at the time of the alleged incident.

Figure 5:
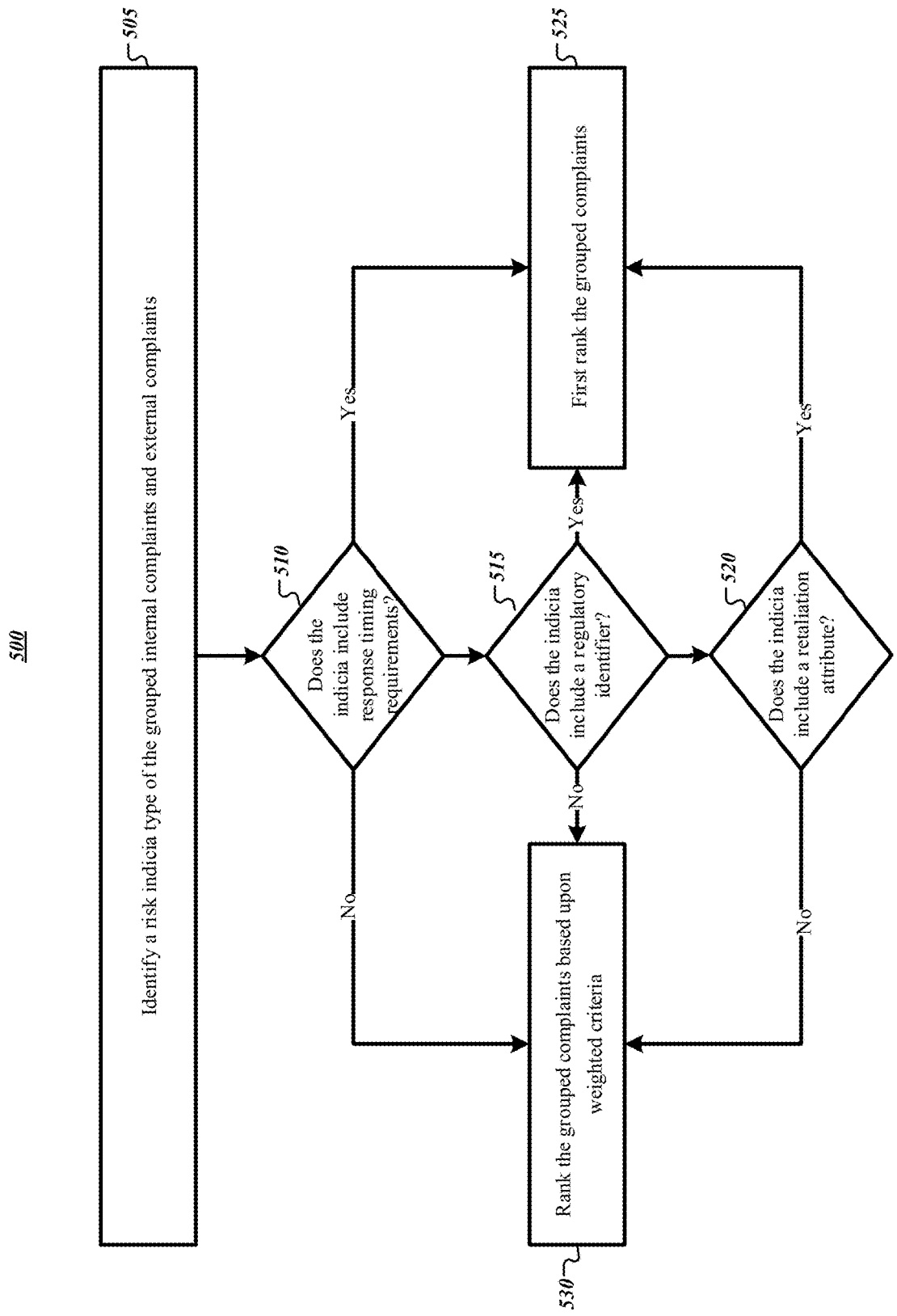
FIG. 5 illustrates an example flowchart for complaint prioritization and ranking, in accordance with some example embodiments described herein.

As described hereafter with reference to FIG. 5, the one or more risk indicia for each internal complaint and each external complaint determined at operations 315, 312 may include response timing requirements, regulatory identifiers, and/or retaliation attributes. As above, this information may also be selected from a list of menu options, presented in response to a geographic prompt, and/or determined from analysis of a free text input. In some embodiments, the one or more risk indicia may include response timing requirements (e.g., to a consumer, a regulatory agency, or the like) such that an internal or external complaint may require expedited or immediate administration to avoid adverse consequences (e.g., threat of litigation, regulatory fines, etc.). In some embodiments, the one or more risk indicia may include regulatory identifiers (e.g., a CFPB complaint, a securities and exchange commission (SEC) investigation, or the like) such that the risk associated with the complaint (e.g., internal or external) is high relative to other complaints. In some other embodiments, the one or more risk indicia may include retaliation attributes, such as in the case of an internal complaint or whistleblower. By way of example, an internal complaint and internal user (e.g., whistleblower) may include risk indicia indicative of potential retaliation against the internal user for the internal complaint.

While described herein with reference to geographic indicators, issue indicators, personnel indicators, response timing requirements, regulatory identifiers, and retaliation attributes, the present disclosure contemplates that the risk prioritization server 200 and risk evaluation circuitry 210 may analyze risk indicia of any type in order to effectively prioritize internal and external complaints. Furthermore, while described above with reference to a single risk indicia for each internal and external complaint, the present disclosure contemplates that each internal and/or external complaint may include various risk indicia of any type such that the operations described hereafter in compiling the internal and the external complaints may consider the risk indicia individually or in combination based upon the intended application of the risk prioritization server 200.

Thereafter, as shown in operation 325, the apparatus (e.g., risk prioritization server 200) includes means, such as processor 202, integration circuitry 212, or the like, for generating a compiled complaint dataset of the one or more internal complaints and the one or more external complaints. As described hereafter with reference to FIG. 4, the risk prioritization server 200 may identify common risk indicia amongst the internal complaints and external complaints and, via the integration circuitry 212, may compile or otherwise group the internal and external complaints based upon the common risk indicia. By way of example, a plurality of external complaints may be received by the risk prioritization server 200, each associated with external users. In particular, a regulatory complaint by a regulatory agency and a consumer complaint may be received related to a particular transaction (e.g., a mortgage loan or the like) or personnel (e.g., having issue risk indicia or personnel risk indicia). Additionally, the risk prioritization server 200 may also receive an internal complaint from an internal user (e.g., employee or business unit) concerning the same transaction or personnel (e.g., having the same issue or personnel risk indicia). The integration circuitry 212 may compile or otherwise group the internal complaint and the external complaint based upon the common risk indicia for further ranking the compiled complaints as described hereafter.

Thereafter, as shown in operation 330, the apparatus (e.g., risk prioritization server 200) includes means, such as processor 202, risk prioritization circuitry 214, or the like, for identifying urgent risk indicia and ranking the compiled complaint dataset based upon the risk indicia. As described hereafter with reference to FIG. 5, the risk prioritization server 200 may identify risk indicia that require immediate action (e.g., response timing requirements, regulatory identifiers, retribution attributes, or the like) and, in some embodiments, first rank these urgent compiled complaints (e.g., compiled internal and external complaints having common risk indicia). In instances in which the risk indicia are not indicative of urgent action, the risk prioritization circuitry 214 may employ weighted criteria in order to rank the compiled internal and external complaints. By way of example, an entity (e.g., financial institution or otherwise) may attempt to reduce response time in an automotive loan business unit. In such an example, the risk prioritization circuitry 214 may weigh compiled internal and external complaints having industry risk indicia indicative of the automotive loan business unit such that these compiled complaints are ranked higher than other similar compiled complaints (e.g., complaints in the mortgage business units).

Figure 4:
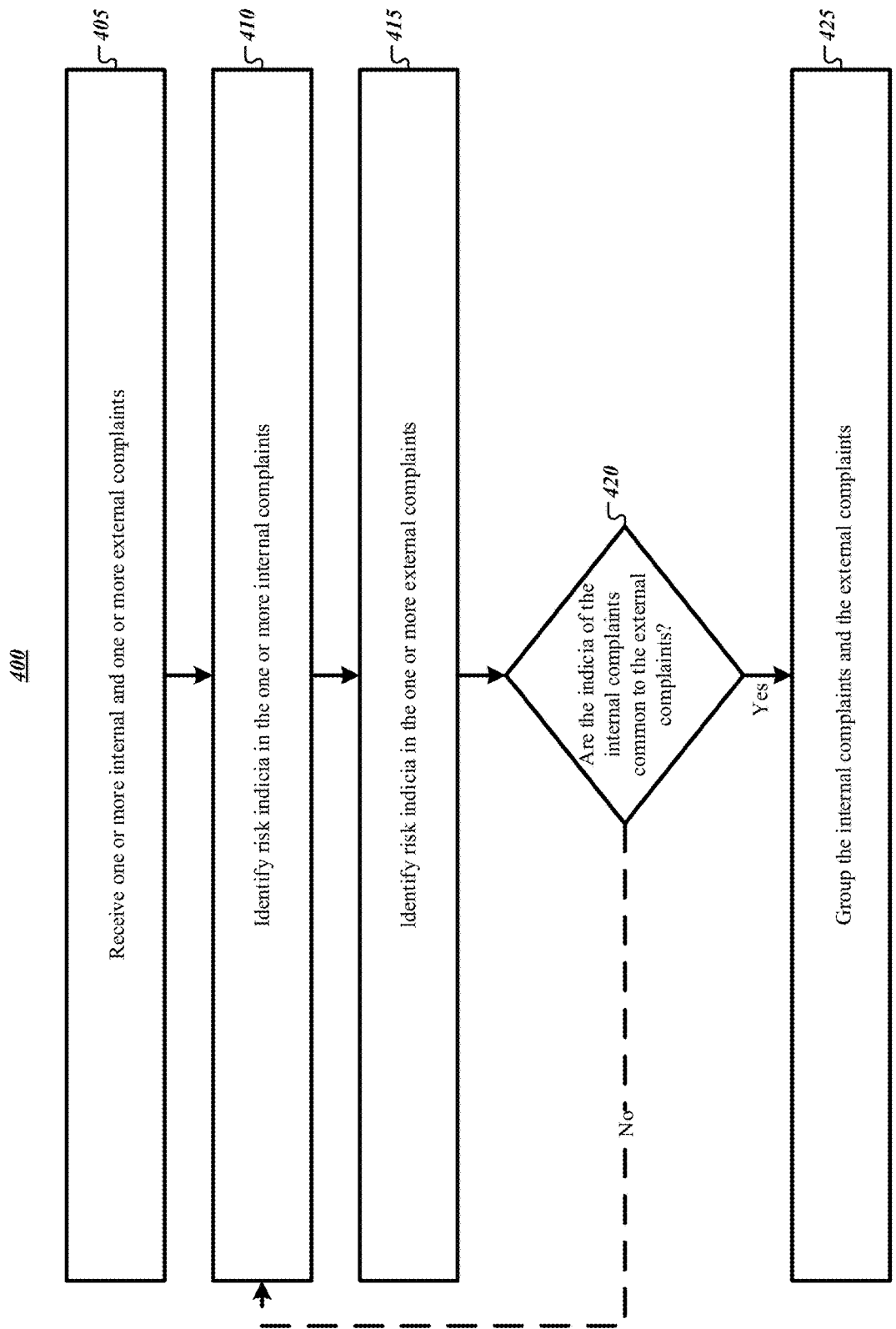
FIG. 4 illustrates an example flowchart for grouping internal and external complaints based upon risk indicia, in accordance with some example embodiments described herein.

Turning next to FIG. 4, a flowchart is shown for grouping internal and external complaints based upon risk indicia. The operations illustrated in FIG. 4 may, for example, be performed by, with the assistance of, and/or under the control of an apparatus (e.g., risk prioritization server 200), as described above. In this regard, performance of the operations may invoke one or more of processor 202, memory 204, input/output circuitry 206, communications circuitry 208, integration circuitry 212, risk evaluation circuitry 210, and/or risk prioritization circuitry 214.

Operations 405, 410, and 415 may operate substantially equivalent to corresponding operations 305-320 in FIG. 3 in that the risk prioritization server 200 may include means, such as the input/output circuitry 206, communications circuitry 208, integration circuitry 210, risk evaluation circuitry 212, or the like for receiving one or more internal and one or more external complaints at operation 405. Thereafter, as shown in operations 410, 415, the risk evaluation circuitry 210 may identify risk indicia in the one or more internal complaints and the one or more external complaints, respectively. As would be evident to one of ordinary skill in the art in light of the present disclosure, the risk prioritization server 200 may receive internal and external complaints simultaneously and may identify risk indicia in the respective complaints simultaneously or in any order. Said differently, the present disclosure contemplates that complaints may be iteratively received by the risk prioritization server 200 and that determination of risk indicia may similarly be iteratively determined.

Turning to operation 420, the apparatus (e.g., risk prioritization server 200) includes means, such as processor 202, integration circuitry 212, or the like, for determining risk indicia common to the internal complaints ant the external complaints. In particular, one or more internal complaints associated with internal users (e.g., employees or business units) may submit complaints related to the same personnel, issue, business units, incident times, geographic locations, regulatory agencies, and the like (e.g., risk indicia) as external complaints from external users (e.g., customers, regulatory agencies, etc.). Traditional methods, however, fail to compile internal and external complaints so as to efficiently dispose of the same. For example, an external complaint from an external user (e.g., a regulatory agency) may traditionally be received by an entity and addressed quickly due to the urgency associated with such complaints. Similar external complaints (e.g., by customers) and internal complaints (e.g., by employees) that relate to the same issue or incident may not be addressed in conjunction with the regulatory complaint. In this way, conventional systems fail to efficiently compile complaints (e.g., internal and external) in order to properly address these similar (or identical complaints) at the same time resulting in response delays. As described above, increased consumer interaction and interest in business transparency and ethics may be hindered by these delayed response times.

Furthermore, addressing each internal and external complaint separately may result in dispositions that lack available information. By way of continued example, an external complaint from an external user (e.g., a regulatory agency) may include information unavailable to internal users or other external users. As such, conventional methods that fail to address complaints related to the same issue or incident may lack information during the administration of the complaint that would otherwise be available if the complaints were addressed together. In this way, entities may suffer from inconsistence rulings, dispositions, and the like for complaints, often concerning the same or related issues.

As illustrated in operation 420, the risk prioritization server 200 of the present disclosure may determine common risk indicia amongst internal and external complaints in order to properly group the internal and the external complaints based upon this common risk indicia at operation 425. The risk prioritization server 200 may identify common risk indicia amongst the internal complaints and external complaints and, via the integration circuitry 212, may compile or otherwise group the internal and external complaints based upon the common risk indicia. As described above, a plurality of external complaints may be received by the risk prioritization server 200, each associated with external users. In particular, a regulatory complaint by a regulatory agency and a consumer complaint may be received related to a particular transaction (e.g., a mortgage loan or the like) or personnel (e.g., having issue risk indicator personnel risk indicia). Additionally, the risk prioritization server 200 may also receive an internal complaint from an internal user (e.g., employee or business unit) concerning the same transaction or personnel (e.g., having the same issue or personnel risk indicia).

Turning to operation 425, the integration circuitry 212 may compile or otherwise group the internal complaints and the external complaints based upon the common risk indicia for further ranking the compiled complaints as described hereafter with reference to FIG. 5. In some embodiments, the integration circuitry 212 may group the internal complaints and the external complaints having common risk indicia as a single combined complaint. In such an embodiment, a single combined complaint (e.g., of related internal and external complaints) may allow for a single response that addresses each complaint simultaneously. In this way, the risk prioritization server 200 may prevent inconsistent complaint responses while also minimizing response delay.

Turning next to FIG. 5, a flowchart is shown for complaint prioritization and ranking. The operations illustrated in FIG. 5 may, for example, be performed by, with the assistance of, and/or under the control of an apparatus (e.g., risk prioritization server 200), as described above. In this regard, performance of the operations may invoke one or more of processor 202, memory 204, input/output circuitry 206, communications circuitry 208, integration circuitry 212, risk evaluation circuitry 210, and/or risk prioritization circuitry 214.

As shown in operation 505, the apparatus (e.g., risk prioritization server 200) includes means, such as input/output circuitry 206, communications circuitry 208, or the like, for identifying a risk indicia type for the grouped internal and external complaints. As described with reference to FIG. 3, risk indicia may refer to potential risk indicia types, categories, requirements, etc. of the internal and external complaints (e.g., a response timing requirement, a regulatory identifier, a retaliation attribute, a geographic indicator, industry indicator, issue indicator, personnel indicator, or the like). As would be evident to one of ordinary skill in the art in light of the present disclosure, risk indicia may refer to any information contained within the internal or external complaints indicative of some associated risk. The risk prioritization circuitry 214 may, at operation 505, identify a type (e.g., geographic indicator, issue indicator, etc.) of risk indicia associated with the grouped internal and external complaints.

As described above, the risk prioritization server 200 may, in some embodiments, identify urgent risk indicia and rank grouped internal and external complaints having urgent risk indicia first. As illustrated in FIG. 5, the risk prioritization server 200 may identify risk indicia that require immediate action (e.g., response timing requirements, regulatory identifiers, retribution attributes, or the like) and, in some embodiments, first rank these urgent compiled complaints (e.g., compiled internal and external complaints having common risk indicia). While described hereafter with reference to response timing requirements, regulatory identifiers, and retaliation attributes, the present disclosure contemplates that any type of risk indicia may be considered by the risk prioritization circuitry 200 as urgent based upon the intended application.

Thereafter, as shown in operation 510, the apparatus (e.g., risk prioritization server 200) includes means, such as processor 202, risk prioritization circuitry 214, or the like, for determining if the risk indicia includes response timing requirements. By way of example, a plurality of internal complaints and external complaints may be grouped (e.g., via the method of FIG. 4) based upon risk indicia that includes a response timing requirement. In some embodiments, the grouped internal and external complaints may also include other common risk indicia (e.g., related to the same issue or personnel). In other embodiments, the internal and external complaints may be grouped only based upon response timing requirements. If the risk prioritization circuitry 214 determines that the risk indicia type of the grouped complaints includes response timing requirements, the risk prioritization circuitry 214 may first rank the grouped complaints at operation 525. In this way, the risk prioritization circuitry 214 may operate to expedite administration of these urgent complaints prior to expiration of a respective response deadline.

Thereafter, as shown in operation 515, the apparatus (e.g., risk prioritization server 200) includes means, such as processor 202, risk prioritization circuitry 214, or the like, for determining if the risk indicia include a regulatory identifier. By way of example, a plurality of internal complaints and external complaints may be grouped (e.g., via the method of FIG. 4) based upon risk indicia that includes a regulatory identifier. In some embodiments, the grouped internal and external complaints may also include other common risk indicia (e.g., related to the same issue or personnel). In other embodiments, the internal and external complaints may be grouped only based upon the regulatory identifier. If the risk prioritization circuitry 214 determines that the risk indicia type of the grouped complaints includes a regulatory identifier, the risk prioritization circuitry 214 may first rank the grouped complaints at operation 525. In this way, the risk prioritization circuitry 214 may operate to expedite administration of these urgent complaints due to the increased risk associated with regulatory compliance.

Thereafter, as shown in operation 520, the apparatus (e.g., risk prioritization server 200) includes means, such as processor 202, risk prioritization circuitry 214, or the like, for determining if the risk indicia includes a retaliation attribute. By way of example, a plurality of internal complaints and external complaints may be grouped (e.g., via the method of FIG. 4) based upon risk indicia that includes a retaliation attribute. As would be evident to one of ordinary skill in the art in light of the present disclosure, complaints (e.g., internal complaints) may result in retaliatory action or other adverse consequences to the internal user associated with the internal complaint. In order to anticipate retaliatory action, if the risk prioritization circuitry 214 determines that the risk indicia type of the grouped complaints includes a retaliation attribute, the risk prioritization circuitry 214 may first rank the grouped complaints at operation 525.

In instances in which the risk indicia are not indicative of urgent action, the apparatus (e.g., risk prioritization server 200) includes means, such as processor 202, risk prioritization circuitry 214, or the like, for using weighted criteria at operation 530 in order to rank the grouped internal and external complaints. As would be evident to one of ordinary skill in the art in light of the present disclosure, the risk prioritization circuitry 214 may employ any weighting scheme, technique, or the like based upon the intended goal or application of the associated entity.

By way of example, an entity associated with the risk prioritization server 200 may employ a weighting scheme designed to minimize the response time for complaints (e.g., internal or external) concerning a particular issue or industry. For example, a financial institution may employ a weighting scheme that ranks complaints (e.g., grouped internal and external complaints) with risk indicia relating to mortgages (e.g., an industry indicator) higher relative to risk indicia relating to automotive loans. In this way, the financial institution may improve response times for grouped complaints relating to mortgages. Furthermore, the risk prioritization server 200 may employ one or more trainable logic models configured to iteratively adjust the weighted criteria over time. By way of continued example, as the response time for mortgage related complaints is minimized, the trainable logic model may adjust the weighted criteria to weigh risk indicia relating to mortgage lower relative to risk indicia relating to, for example, automotive loans.

FIGS. 3-5 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the risk prioritization server 200 and executed by a processor 202 of the risk prioritization server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Turning next to FIG. 6, an example interface for receiving complaints is illustrated. As described above with reference to FIG. 3, internal users and external users may input information related to the respective internal and external complaints such as the user's name, date of complaint, date of incident, location of incident, applicable industry, name of agent (e.g. or other allegedly offending party), etc. As shown, an example user interface 600 may include prompts, menus, inputs, and/or the like configured to receive information related to the complaint from the internal and external users. In some embodiments, the user interface 600 may include free text entry locations 605, 610 configured to receive free text inputs from the user. As shown, these free text entry locations 605, 610 may be configured to receive any information related to the internal or external complaint (e.g., user name, complaint date, etc.). Additionally, the user interface 600 may include menus or other limited option selections 615, 620. By way of example, an internal or external user may be prompted to select the industry or business unit to which the complaint pertains at menu 615 and the personnel or agent to which the complaint pertains at menu 620.

As described above, various technical challenges are surmounted via technical solutions contemplated herein. For instance, embodiments of the present disclosure provide improved risk identification and prioritization by receiving one or more internal and external complaints and identifying risk indicia (e.g., response timing requirements, regulatory identifiers, retaliation attributes, geographic indicators, and the like). These internal and external complaints are subsequently compiled and ranked based upon the identified risk indicia in order to properly prioritize the compiled complaints for efficient administration of the same. In doing so, such example implementations confront and solve at least three technical challenges: (1) they reliably identify risk indicia associated with complaints, (2) they efficiently compile and rank internal and external complaints based upon identified risk, and (3) they anticipate and protect internal users from potential retaliation.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for complaint risk identification and prioritization, the method comprising:
   receiving, by a computing device, one or more internal complaints, wherein each internal complaint is associated with an internal user;
   determining, via risk evaluation circuitry, one or more risk indicia for each internal complaint;
   receiving, by the computing device, one or more external complaints distinct from the one or more internal complaints, wherein each external complaint is associated with an external user distinct from the internal user;
   determining, via the risk evaluation circuitry, one or more risk indicia for each external complaint, wherein the risk indicia further comprise a retaliation attribute;
   generating, via integration circuitry, a compiled complaint dataset of the one or more internal complaints and the one or more external complaints, wherein generating the compiled complaint dataset further comprises grouping the internal complaints and the external complaints based upon the retaliation attribute;
   determining, via risk prioritization circuitry, a weighted criteria for each risk indicia;
   ranking, by the risk prioritization circuitry, the compiled complaint dataset based upon the one or more risk indicia and associated weighted criteria for each internal complaint and the one or more risk indicia and associated weighted criteria for each external complaint, wherein ranking the compiled complaint dataset further comprises first ranking grouped internal and external complaints having the retaliation attribute, wherein the ranked compiled complaint dataset defines an order for addressing the one or more internal complaints and the one or more external complaints;
   supplying the ranked compiled complaint dataset to a trainable logic model;
   iteratively adjusting, by the trainable logic model, the weighted criteria for each risk indicia over time; and
   modifying the ranked compiled complaint dataset based upon at least one adjusted weighted criteria.

2. The method according to claim 1, wherein the internal user comprises a user having access to one or more internal applications of the computing device.

3. The method according to claim 1, wherein generating the compiled complaint dataset further comprises grouping internal complaints and external complaints having one or more common risk indicia.

4. The method according to claim 1, wherein the one or more risk indicia for each internal complaint and the one or more risk indicia for each external complaint further comprise response timing requirements, and wherein generating the compiled complaint dataset further comprises grouping the internal complaints and the external complaints based upon the response timing requirement.

5. The method according to claim 4, wherein ranking the compiled complaint dataset further comprises first ranking grouped internal and external complaints having the response timing requirement from amongst the grouped internal and external complaints having the retaliation attribute.

6. The method according to claim 1, wherein the one or more risk indicia for each internal complaint and the one or more risk indicia for each external complaint further comprise a regulatory identifier and wherein generating the compiled complaint dataset further comprises grouping the internal complaints and the external complaints based upon the regulatory identifier.

7. The method according to claim 6, wherein ranking the compiled complaint dataset further comprises first ranking grouped internal and external complaints having the regulatory identifier from amongst the grouped internal and external complaints having the retaliation attribute.

8. An apparatus for complaint risk identification and prioritization, the apparatus comprising:
   communications circuitry configured to:
      receive one or more internal complaints, wherein each internal complaint is associated with an internal user, and
      receive one or more external complaints distinct from the one or more internal complaints, wherein each external complaint is associated with an external user distinct from the internal user;
   risk evaluation circuitry configured to:
      determine one or more risk indicia for each internal complaint, and
      determine one or more risk indicia for each external complaint, wherein the risk indicia further comprise a retaliation attribute;
   integration circuitry configured to generate a compiled complaint dataset of the one or more internal complaints and the one or more external complaints, wherein the integration circuitry is further configured to generate the compiled complaint dataset by grouping the internal complaints and the external complaints based upon the retaliation attribute; and
   risk prioritization circuitry configured to:
      determine a weighted criteria for each risk indicia;
      rank the compiled complaint dataset based upon the one or more risk indicia and associated weighted criteria for each internal complaint and the one or more risk indicia and weighted criteria for each external complaint, wherein the risk prioritization circuitry is further configured to rank the compiled complaint dataset by grouping internal and external complaints having the retaliation attribute, wherein the ranked compiled complaint dataset defines an order for addressing the one or more internal complaints and the one or more external complaints;
      supply the ranked compiled complaint dataset to a trainable logic model;
      iteratively adjust, by the trainable logic model, the weighted criteria for each risk indicia over time; and
      modify the ranked compiled complaint dataset based upon at least one adjusted weighted criteria.

9. The apparatus according to claim 8, wherein the internal user comprises a user having access to one or more internal applications of the apparatus.

10. The apparatus according to claim 8, wherein the integration circuitry is further configured to group internal complaints and external complaints having one or more common risk indicia.

11. The apparatus according to claim 8, wherein the one or more risk indicia for each internal complaint and the one or more risk indicia for each external complaint further comprise response timing requirements and wherein the integration circuitry is further configured to, in generating the compiled complaint dataset, group the internal and the external complaints based upon the response timing requirement.

12. The apparatus according to claim 11, wherein the risk prioritization circuitry is further configured to first rank grouped internal and external complaints having the response timing requirement from amongst the grouped internal and external complaints having the retaliation attribute.

13. The apparatus according to claim 8, wherein the one or more risk indicia for each internal complaint and the one or more risk indicia for each external complaint further comprise a regulatory identifier and wherein the integration circuitry is further configured to, in generating the compiled complaint dataset, group the internal and the external complaints based upon the regulatory identifier.

14. The apparatus according to claim 13, wherein the risk prioritization circuitry is further configured to first rank grouped internal and external complaints having the regulatory identifier from amongst the grouped internal and external complaints having the retaliation attribute.

15. A non-transitory computer-readable storage medium for using an apparatus for complaint risk identification and prioritization, the non-transitory computer-readable storage medium storing instructions that, when executed, cause the apparatus to:
receive one or more internal complaints, wherein each internal complaint is associated with an internal user;
determine one or more risk indicia for each internal complaint;
receive one or more external complaints distinct from the one or more internal complaints, wherein each external complaint is associated with an external user distinct from the internal user;
determine one or more risk indicia for each external complaint, wherein the risk indicia further comprise a retaliation attribute;
generate a compiled complaint dataset of the one or more internal complaints and the one or more external complaints, wherein generating the compiled complaint dataset further comprises grouping the internal complaints and the external complaints based upon the retaliation attribute;
determine a weighted criteria for each risk indicia;
rank the compiled complaint dataset based upon the one or more risk indicia and weighted criteria for each internal complaint and the one or more risk indicia and weighted criteria for each external complaint, wherein ranking the compiled complaint dataset further comprises first ranking grouped internal and external complaints having the retaliation attribute, wherein the ranked compiled complaint dataset defines an order for addressing the one or more internal complaints and the one or more external complaints;
supply the ranked compiled complaint dataset to a trainable logic model;
iteratively adjust, by the trainable logic model, the weighted criteria for each risk indicia over time; and
modify the ranked compiled complaint dataset based upon at least one adjusted weighted criteria.

16. The non-transitory computer-readable storage medium according to claim 15, wherein the internal user comprises a user having access to one or more internal applications of the apparatus.

17. The method according to claim 1, wherein the modification of the ranked compiled complaint dataset based upon the at least one adjusted weighted criteria comprises a reordering of at least one external complaint and at least one internal complaint.

18. The non-transitory computer-readable storage medium according to claim 15, wherein generating the compiled complaint dataset further comprises grouping internal complaints and external complaints having one or more common risk indicia.

19. The non-transitory computer-readable storage medium according to claim 15, wherein the one or more risk indicia for each internal complaint and the one or more risk indicia for each external complaint further comprise response timing requirements, and wherein generating the compiled complaint dataset further comprises grouping the internal complaints and the external complaints based upon the response timing requirement.

20. The non-transitory computer-readable storage medium according to claim 19, wherein ranking the compiled complaint dataset further comprises first ranking grouped internal and external complaints having the response timing requirement from amongst the grouped internal and external complaints having the retaliation attribute.

21. The non-transitory computer-readable storage medium according to claim 15, wherein the one or more risk indicia for each internal complaint and the one or more risk indicia for each external complaint further comprise a regulatory identifier and wherein generating the compiled complaint dataset further comprises grouping the internal complaints and the external complaints based upon the regulatory identifier.

22. The non-transitory computer-readable storage medium according to claim 21, wherein ranking the compiled complaint dataset further comprises first ranking grouped internal and external complaints having the regulatory identifier from amongst the grouped internal and external complaints having the retaliation attribute.

* * * * *